US009357691B2

(12) United States Patent
Brockmann

(10) Patent No.: US 9,357,691 B2
(45) Date of Patent: Jun. 7, 2016

(54) HYDRAULIC ARRANGEMENT FOR A LIFTING UNIT

(75) Inventor: Andreas Brockmann, Bidingen (DE)

(73) Assignee: AGCO International GmbH, Neuhausen (CH)

(*) Notice: Subject to any disclaimer, the term of this patent is extended or adjusted under 35 U.S.C. 154(b) by 313 days.

(21) Appl. No.: 13/997,391

(22) PCT Filed: Dec. 14, 2011

(86) PCT No.: PCT/EP2011/072721
§ 371 (c)(1),
(2), (4) Date: Dec. 4, 2013

(87) PCT Pub. No.: WO2012/084634
PCT Pub. Date: Jun. 28, 2012

(65) Prior Publication Data
US 2014/0076153 A1   Mar. 20, 2014

(30) Foreign Application Priority Data

Dec. 24, 2010  (GB) .................................. 1021961.6

(51) Int. Cl.
*B60T 13/20* (2006.01)
*A01B 63/10* (2006.01)
*F15B 11/08* (2006.01)
*A01D 41/14* (2006.01)

(52) U.S. Cl.
CPC ............. *A01B 63/10* (2013.01); *A01B 63/1006* (2013.01); *A01D 41/145* (2013.01); *F15B 11/08* (2013.01)

(58) Field of Classification Search
CPC ...... A01B 63/10; A01B 63/11; A01B 61/046; A01B 61/048; F15B 1/02; F15B 13/04; F15B 9/08

USPC ................................ 91/444; 60/554, 558, 559
See application file for complete search history.

(56) References Cited

U.S. PATENT DOCUMENTS 4,622,886 A * 11/1986 Imada et al. .................... 91/520
6,460,623 B1 * 10/2002 Knussman et al. ............... 172/4

(Continued)

FOREIGN PATENT DOCUMENTS

DE      4028887 A1    3/1992
DE      4030950 A1    4/1992

(Continued)

OTHER PUBLICATIONS

JP 2004350514—Machine Translation from Espacenet, Outer Hydraulic Pressure Takeout Apparatus in Working Vehicle, Pub date—Dec. 2004.*

(Continued)

*Primary Examiner* — Nathaniel Wiehe
*Assistant Examiner* — Daniel Collins

(57) ABSTRACT

A hydraulic arrangement for lifting and/or lowering at least one implement carrying arm on an agricultural machine. The arrangement comprises an inlet hydraulic line and an outlet hydraulic line connecting a fluid pump (18) and a fluid reservoir (26) respectively to a first valve means (12), said arrangement comprising at least one dual acting hydraulic cylinder (15) for lifting/and or lowering the implement carrying arm. The at least one cylinder is connected to the first valve means (12) allowing the cylinder (15) to be switched between a single acting mode wherein the arm can be lifted and a double acting mode wherein the arm can be lifted and lowered.

12 Claims, 5 Drawing Sheets

(56) References Cited

U.S. PATENT DOCUMENTS

| | | | |
|---|---|---|---|
| 6,951,103 B2* | 10/2005 | Berthod et al. | 60/413 |
| 2004/0177749 A1* | 9/2004 | Joergensen | 91/445 |
| 2004/0194618 A1* | 10/2004 | Joergensen | A01B 63/1013 91/471 |

FOREIGN PATENT DOCUMENTS

| | | | |
|---|---|---|---|
| DE | 102007048697 A1 | | 4/2009 |
| JP | 2005065503 A | | 8/2003 |
| JP | 2004350514 A | * | 12/2004 |
| JP | 2004350514 A | | 12/2004 |

OTHER PUBLICATIONS

International Search Report for International Application No. PCT/EP2011/072721 Dated Mar. 9, 2012.

GB Search Report for GB Application No. 1021961.6 Dated Apr. 20, 2011.

* cited by examiner

HYDRAULIC ARRANGEMENT FOR A LIFTING UNIT

BACKGROUND OF THE INVENTION

1. Field of Invention

This invention relates to a hydraulic lifting and lowering arrangement on a self propelled machine. More specifically the invention relates to a lifting and lowering arrangement of an implement carrying arm on an agricultural machine.

2. Description of Related Art

Agricultural machines, such as forage harvesters for example may be equipped with implements to be worked over the ground. The implement may carry out processes such as cutting grass, grain, maize or working the soil. Owing to the variety of working processes and terrain conditions a self propelled machine must be capable of carrying and moving a wide range of different implements of varying weights under different working conditions.

For some processes such as heavy soil tillage, the full weight of the implement rests on the ground. In other working conditions the full weight of the implement will be carried by the machine so that the implement does not touch the ground. This would be the case for example with maize harvesting. In other cases, such as grass harvesting, part of the weight of the implement is carried by the machine and part of the weight is borne by the ground.

Typical lifting arrangements on agricultural machines comprise one or more carrying arms to which an implement is attached and which can be moved to lift and lower an implement. A carrying arm is movable around one, or more pivot points by one or more hydraulic cylinders. There is therefore mechanical and hydraulic friction with such an arrangement. The amount of friction will depend on the direction of movement of the arms and will be different from the extending and retracting stroke of the cylinders which will lead to hysteresis.

Some implements which are attached to the machine are to be moved in one direction only (upwards) since to move the implement downwards using the cylinders could damage the ground or implement. Such implements require a single acting hydraulic cylinder or a double acting hydraulic cylinder that can be used in single acting mode. Typically, the hydraulic arrangement is arranged such that pressurisation of the cylinder extends the piston rod which raises a carrying arm and implement. When the cylinder is not pressurised the piston retracts slowly under the weight of the attached implement lowering the carrying arm and implement to the ground.

Owing to mechanical and hydraulic friction in a hydraulic arrangement, the weight of the attached implement may not be sufficient to contract the cylinder to lower the carrying arm. Such implements will require a double acting hydraulic cylinder so that the implement can be both lifted and lowered to the ground by controlling the pressure exerted on the hydraulic cylinders.

Also, for maintenance of a forage harvester it is necessary to dismount an intake from the carrying arms to allow maintenance work to the machine to be carried out. This means that there is no weight attached to the carrying arms and therefore if a single acting hydraulic cylinder is used the cylinders cannot be retracted and therefore the carrying arms cannot be lowered unless an external force is applied to the carrying arms.

It is a known problem to retract a double acting cylinder which is connected to a single acting valve arrangement as it must be pushed in manually. This means the attached carrying arm must be pushed downwards manually if it is to be lowered.

Alternatively, if the carrying arm has already been detached for maintenance purposes, the attachment rods (to which the carrying arms are mounted) must pushed in manually. It is known that hydraulic cylinders used on medium or large size machines cannot be pushed in manually because the frictional force is so high that it can not be overcome by human force alone.

BRIEF SUMMARY OF THE INVENTION

It is an aim of the invention to overcome the problem set out above and provide a hydraulic arrangement for moving a carrying arm on an agricultural machine in which the function of the hydraulic cylinders can be easily switched between a single acting mode and a double acting mode using a single valve arrangement.

It is a further aim of the invention to provide an hydraulic arrangement which is suitable for moving both heavy and light implements attached to a carrying arm in a manner that the pressure required to lift a light implement will be raised artificially to the same level that is required to lift a heavy implement.

In accordance with the invention there is provided an hydraulic arrangement for lifting and/or lowering at least one implement carrying arm on an agricultural machine having the features of claim 1.

In case of maintenance and service it may be necessary for a person to position himself under an implement mounted to a forage harvester. In order to prevent serious injuries due to an operator lifting or lowering the implement, there is legislation stating that it must be possible to lock and hold the at least one hydraulic cylinder so that its movement does not caused injury.

Preferably, the hydraulic arrangement comprises a blocking valve to prevent unwanted movement of the at least one cylinder.

Further preferred features of the invention are set out in the dependent claims.

BRIEF DESCRIPTION OF THE DRAWINGS

The invention will now be described by example only, with reference to the following drawings in which.

DETAILED DESCRIPTION OF THE INVENTION

Figure 1:
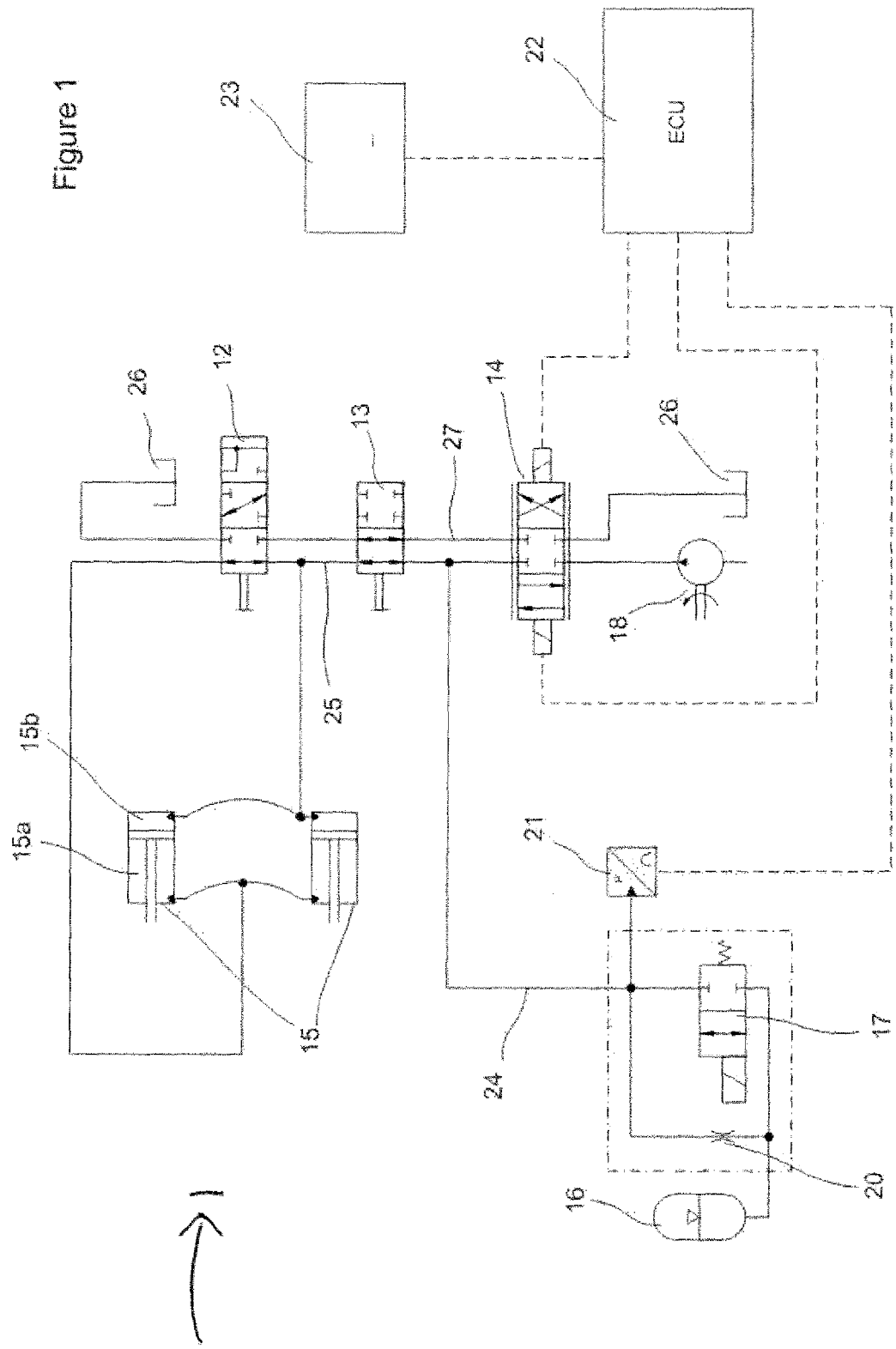
FIG. 1 is a circuit diagram of the hydraulic arrangement in accordance with the invention.

FIG. 1 is an hydraulic circuit 1 for controlling movement (lifting and/or lowering) of at least one carrying arm on an agricultural machine, for example a forage harvester. A variety of implements such as a mower, plough or crop cutter may be attached to the carrying arm.

The carrying arm, or carrying arms (not shown) are connected to one or more dual acting cylinders 15. In FIG. 1, two dual acting cylinders are shown for use with two carrying arms. Both the piston end 15a and cap end 15b of the cylinders are connected to a first valve means 12 which is a 4/3 directional valve. Directional valve 12 is connected by hydraulic line 25 to a blocking valve 13 and a second valve means 14. Second valve means 14 is a 4/4 directional control valve. Valve 14 is connected to a pump 18. Valves 12, 13, 14 are also connected to fluid reservoirs 26 by hydraulic line 27. Valves 12 and 13 are shown as being manually operable by an operator pushing them, however other valves such as mechanically, electrically or pneumatically operated valves could also be used. Valve 14 is electrically operable by means of signal from an ECU 22 (explained below).

When an implement is fitted to the carrying arms and the machine is travelling over undulating surface conditions the weight distribution between the ground and the machine is kept constant by a control system. The control system comprises a pressure transducer 21, an ECU unit 22 and a control panel 23. The transducer 21 constantly measures the pressure in hydraulic line 24 and the ECU continually compares this value with a pressure entered into the control panel 23 by the operator. If the pressure in hydraulic line 24 is too high, control valve 14 can be activated to lower the implement. If the pressure is too low, control valve 14 can be activated to lift the implement. Such a control system is well known and does not form part of the invention and is therefore excluded from FIGS. 2 to 5.

Figure 2:
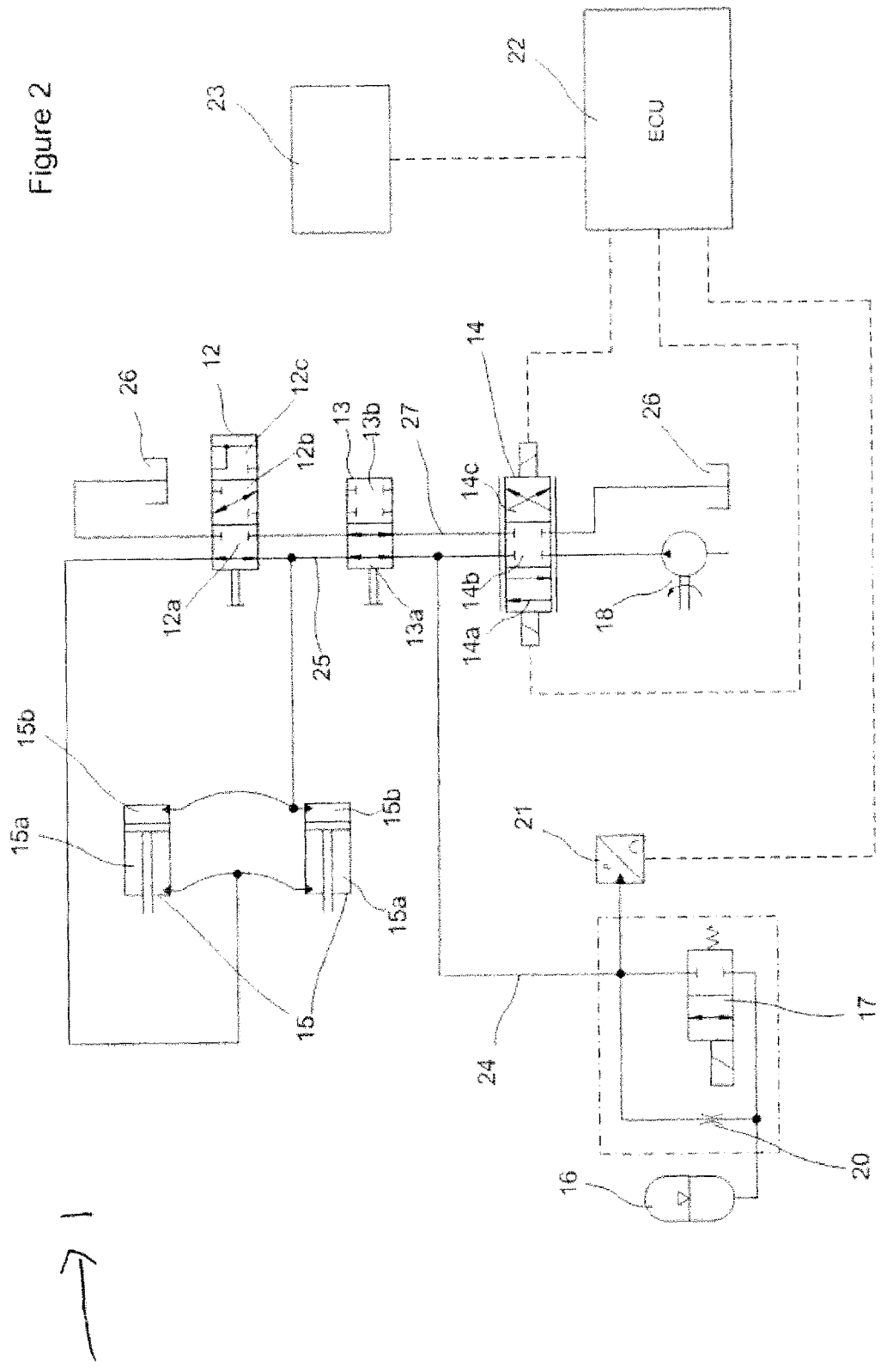
FIG. 2 is a circuit diagram of the hydraulic arrangement of FIG. 1 in which the circuit is single acting and is suitable for use with a light implement.

FIG. 2 shows valve 12 in a first position 12a for when a light implement, such as a grass cutting implement is attached to the carrying arms. Valve 13 is in the open position 13a. When valve 14 is moved from the closed position 14b into the open position 14a, fluid is pumped through line 25. With valve 12 in position 12a both the piston end 15a and cap end 15b of cylinders 15 are connected to line 25 and the pressure in cap end 15b can be increased pushing the piston out and raising the carrying arm and attached implement. This results in quick movement and high pressure facilitating easier control because the distance between the pressure level that needs to be controlled and the pressure level that is caused by hysteresis has been increased. The system is single acting. By moving valve 14 into position 14c, the weight of the implement will cause the cylinders 15 to retract, moving fluid from the cap ends 15b through line 25 to the reservoir 26. Also the piston ends of the cylinders will be filled. The actual lowering speed can be adjusted easily as valve 14 is a proportional valve.

The accumulator 16 serves to absorb vibrations caused by the machine running over undulating ground and can be connected and disconnected by valve 17 in order to react to different operating conditions. It also supports the pressure control system described above because the hydraulic accumulator in conjunction with the cylinder acts similar to a mechanical spring. If the valve is connected any changes in pressure will fed directly to the accumulator. If the valve 17 is disconnected constriction 20 serves as a pressure balance. For example, if the accumulator is switched off and a new heavier implement is attached, constriction 20 prevents carrying arm crashing down. Likewise, if a lighter implement is attached it prevents the carrying arm lifting.

Figure 3:
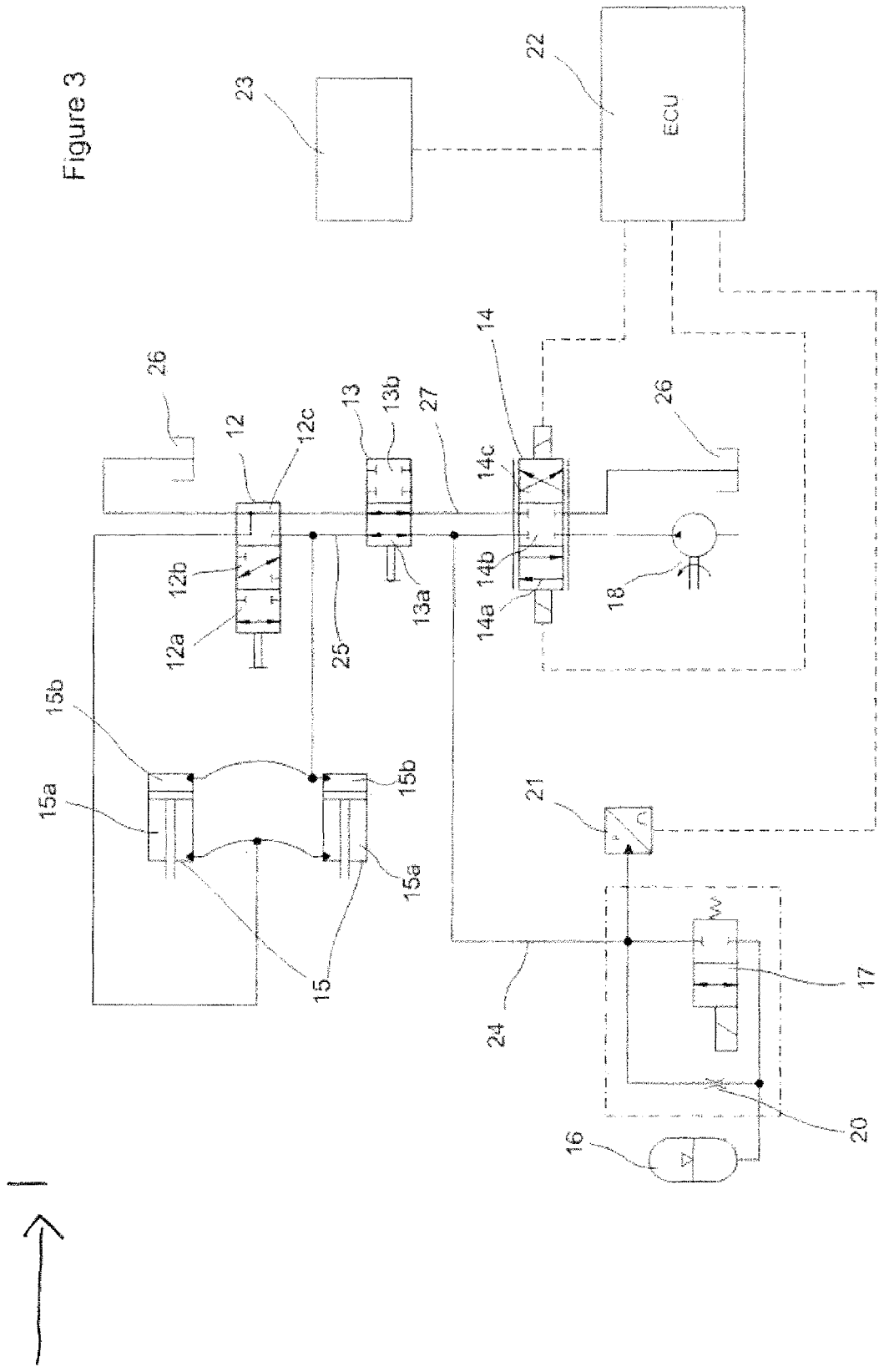
FIG. 3 is a circuit diagram of the hydraulic arrangement of FIG. 1 in which the circuit is single acting and is suitable for use with a heavy implement.

FIG. 3 shows the hydraulic arrangement when valve 12 is moved into position 12c for when a heavy attachment, such as a corn header is attached to the carrying arms. In position 12c cylinder piston ends 15a are connected to hydraulic line 27 and the hydraulic line 25 is connected to the cylinder cap ends 15b. Valve 13 is in the open position 13a. This arrangement is single acting. When valve 14 is moved to open position 14a pressure only acts on the cap end sides 15b of the pistons allowing a large force to be exerted on the pistons, to extend it, thus raising the arm. At the same time pressure on the piston side 15a is released through line 27 to reservoirs 26. When valve 14 is moved to position 14c the cylinders can retract under the weight of the attached implement and the carrying arms lower as fluid flows from the cylinders through line 27 to the reservoir 26.

Figure 4:
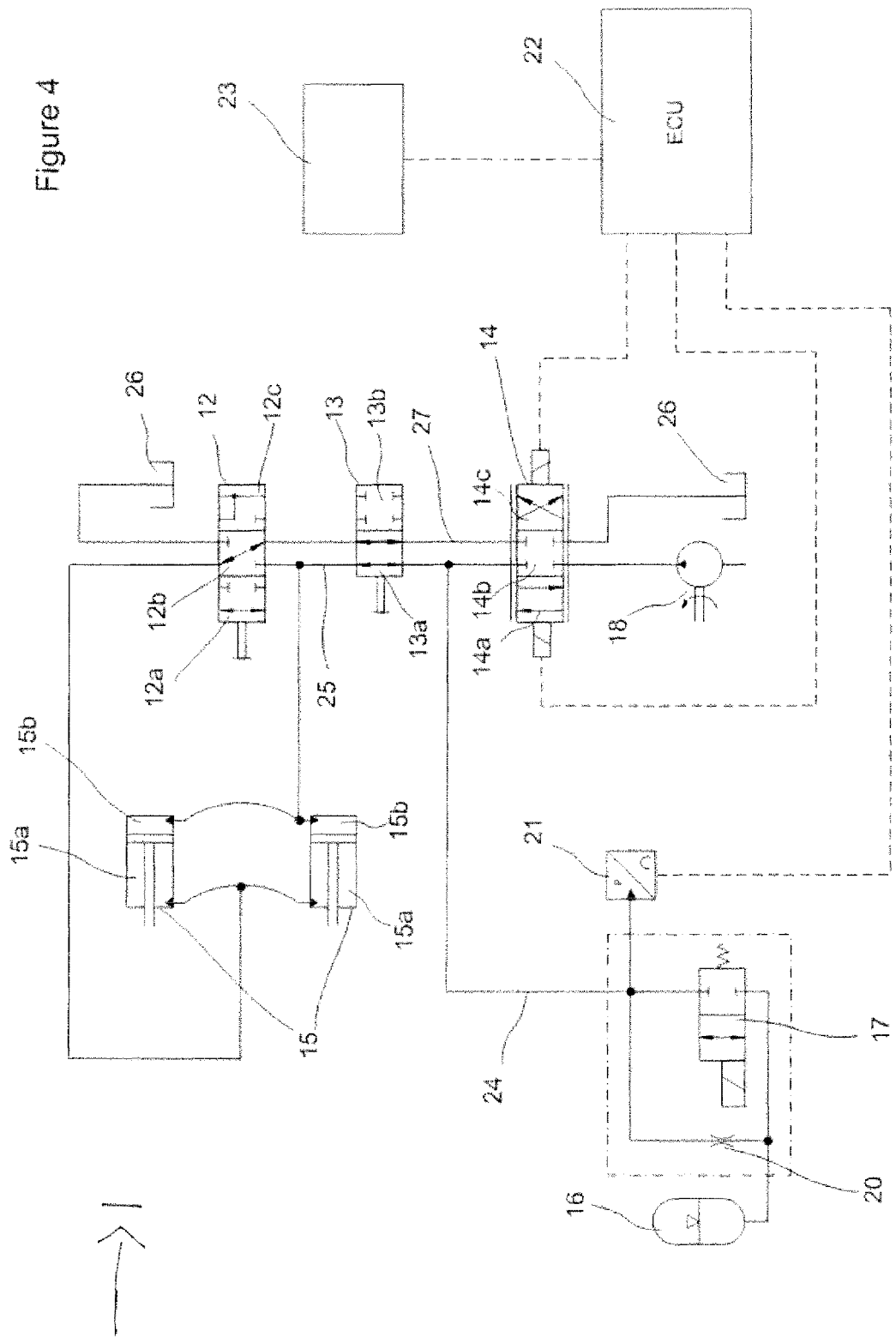
FIG. 4 is a is a circuit diagram of the hydraulic arrangement of FIG. 1 in which the circuit is double acting.

FIG. 4 shows the hydraulic arrangement when valve 12 is moved into position 12b so that line 27 is connected to the piston ends 15a of the cylinders 15 and line 25 is connected to the cap ends 15b of the cylinders. Valve 13 is in the open position 13a. With this arrangement the cylinders 15 are double acting. When valve 14 is moved to open position 14a fluid can flow through line 25 to the cap ends 15b exerting a pressure on the piston and extending the pistons lifting the carrying arms and an attached implement. Fluid in piston ends 15a can flow through line 27 to reservoir 16. If the valve 14 is then moved to position 14b, the weight of the attached implement will cause pistons 15 to retract and fluid will flow from the cap ends 15b to reservoir 26. If, however, there is no implement attached to the carrying arms the weight of the arms alone will not provide a strong enough force to retract the cylinders and the carry arms will remain in a lifted position. It may be necessary to lower the arms to allow maintenance work to be done to the machine. In order to lower the arms, the hydraulic arrangement can be used to provide a force on the piston to retract the pistons.

With the valve 12 in position 12c and valve 14 in position 14b, the pump 18 can be used to pump fluid through line 27 to the piston ends 15a of the cylinders to provide a force on the piston to retract the piston and thus lower the carrying arms.

Figure 5:
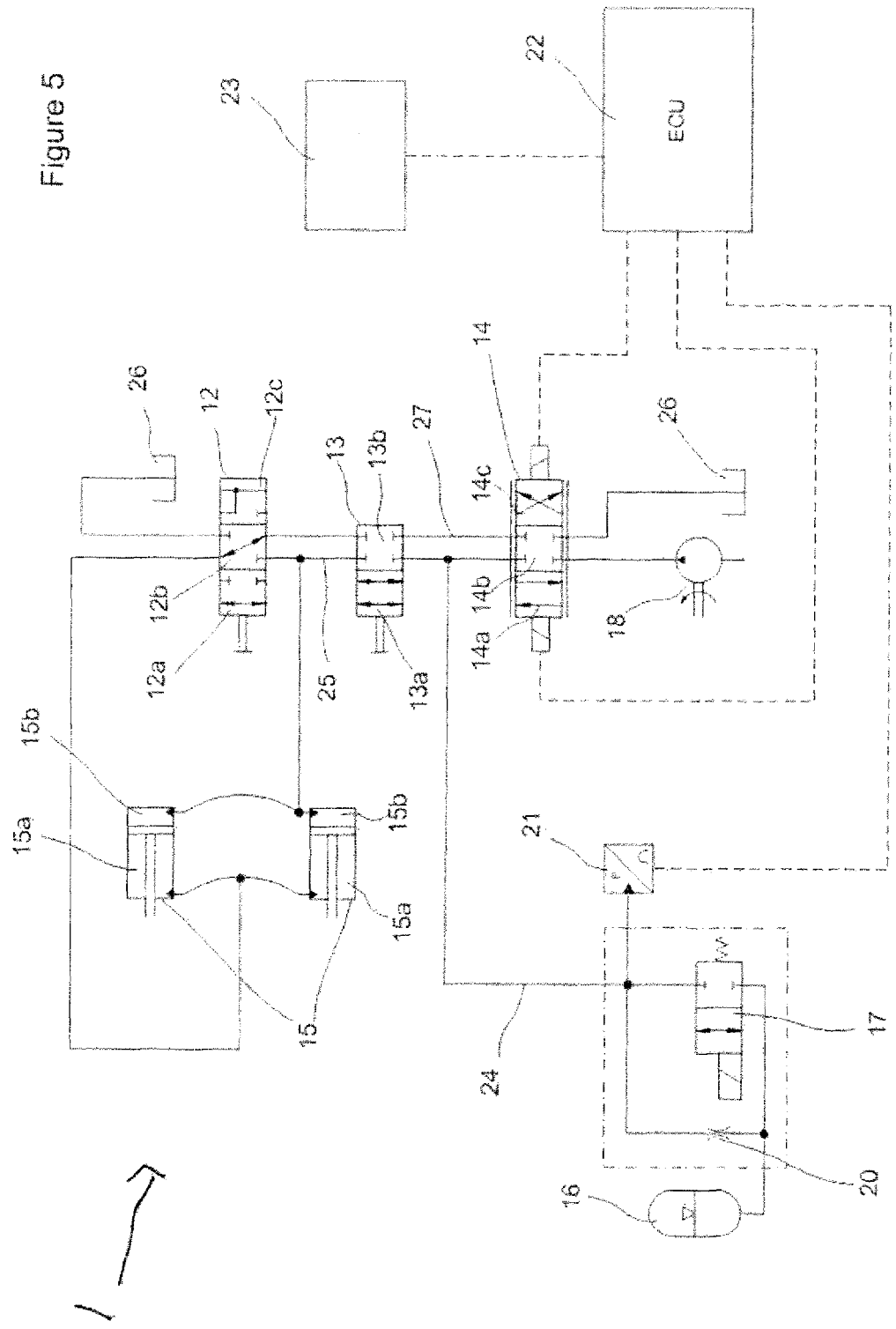
FIG. 5 is a circuit diagram of the hydraulic arrangement of FIG. 1 in which the circuit is in a locked position.

FIG. 5 shows the case where blocking valve 13 is in the closed position 13b. Valve 13 can be manually pushed by the operator into the closed position. Essentially the cylinders 15 are locked in position so that the carrying arms cannot move. This is a safety measure so that it is safe for a person to carry out maintenance, or checks close to the carrying arms without there being any danger of movement of the arms.

The invention claimed is:

1. A hydraulic arrangement for lifting and/or lowering at least one implement carrying arm on an agricultural machine, said arrangement comprising an inlet hydraulic line and an outlet hydraulic line connecting a fluid pump and a fluid reservoir respectively to a first valve, said arrangement comprising at least one dual acting hydraulic cylinder for lifting and/or lowering the implement carrying arm, wherein a piston end and a cap end of at least one cylinder is connected to the first valve allowing the cylinder to be switched between a single acting mode or lifting a light implement attached to at least one carrying arm, a single acting mode for lifting a heavy implement attached to the carrying arm and a double acting mode for lifting and lowering an implement attached to the arm, characterized in that the inlet and outlet lines are connected to a second valve, said second valve adjustable to connect the pump to the inlet line and the reservoir to the outlet line and adjustable to connect the pump to the outlet line and the inlet line to the reservoir.

2. A hydraulic arrangement as claimed in claim 1 wherein the first valve is adjustable to connect the inlet hydraulic line to both the piston end and cap end of the hydraulic cylinder, and adjustable to connect the outlet hydraulic line to the piston end of the hydraulic cylinder, and adjustable to connect the outlet hydraulic line to both the reservoir and the piston end of the cylinder.

3. A hydraulic arrangement as claimed in claim 1 wherein the second valve is adjustable to disconnect the pump and reservoir from the inlet and outlet hydraulic lines.

4. A hydraulic arrangement as claimed in claim 1 wherein the first valve and second valve are directional valves.

5. A hydraulic arrangement as claimed in claim 1 wherein the arrangement is provided with a blocking valve to stop movement of the cylinder.

6. A hydraulic arrangement as claimed in claim 5 wherein the blocking valve is connected to the first and second valves.

7. A hydraulic arrangement as claimed in claim 1 provided with an accumulator circuit.

8. A hydraulic arrangement as claimed in claim 1 wherein the first valve is manually adjusted.

9. A hydraulic arrangement as claimed in claim 5 wherein the blocking valve is manually operated.

10. A hydraulic arrangement as claimed in claim 1 wherein to raise a light implement attached to the at least one implement carrying arm, the second valve is adjusted to connect the pump to the inlet line and the first valve is adjusted to connect at least one cylinder to the inlet line.

11. A hydraulic arrangement as claimed in claim 1 wherein to raise a heavy implement attached to the at least one carrying arm, the first valve is adjusted to connect the outlet line to at least one piston end and connect the inlet line to at least one cylinder cap end and wherein the second valve is adjusted to connect the pump to the inlet line and reservoir to the outlet line.

12. A hydraulic arrangement as claimed in claim 1 wherein to lower the heavy implement the second valve is adjusted to connect the pump to the inlet line and the reservoir to the outlet line.

\* \* \* \* \*